United States Patent [19]
McHarg et al.

[11] Patent Number: 5,388,238
[45] Date of Patent: Feb. 7, 1995

[54] SYSTEM AND METHOD FOR MONITORING THE VALIDITY OF CIRCULATING POINTERS IN A FIFO MEMORY

[75] Inventors: Christopher G. McHarg, Winfield; Kenneth N. Schaff, Warrenville, both of Ill.

[73] Assignee: AT&T Corp., Murray Hill, N.J.

[21] Appl. No.: 919,462

[22] Filed: Jul. 24, 1992

[51] Int. Cl.⁶ .................. G06F 12/00; H04Q 11/04; G11C 19/00; G11C 21/00
[52] U.S. Cl. ...................... 395/425; 395/400; 365/73; 365/221; 370/60; 370/94.1; 364/DIG. 1
[58] Field of Search ............ 395/425, 400, 550; 370/60, 92, 93, 94.1, 94.2; 365/221, 233, 236, 73

[56] References Cited

U.S. PATENT DOCUMENTS

| | | | |
|---|---|---|---|
| 4,751,697 | 6/1988 | Hunter et al. | 370/60 |
| 5,027,326 | 6/1991 | Jones | 365/221 |
| 5,027,330 | 6/1991 | Miller | 365/239 |
| 5,150,463 | 9/1992 | Ward et al. | 395/200 |
| 5,224,093 | 6/1993 | Denzel et al. | 370/60 |
| 5,233,603 | 8/1993 | Takeuchi et al. | 370/60 |

*Primary Examiner*—Glenn Gossage
*Attorney, Agent, or Firm*—Michael B. Johannesen

[57] ABSTRACT

A system and method are described for enforcing the validity of circulating pointers stored in a pointer FIFO (first-in-first-out) memory. One or more target pointers are generated and compared to circulating pointers. If a pointer does not circulate through the system within a pre-specified time, then a pointer has been lost and an error is reported. If a circulating pointer matches a target pointer, it is suppressed by being removed from the set of circulating pointers. Another timer is then set to determine whether further circulating pointers match a target pointer. If so, then multiple pointers to the same location are present and all duplicate pointers are suppressed. After expiration of the second time, the target pointers are added to the set of circulation pointers. This process repeats with new target pointers, so that the validity of the set of circulating pointers is verified.

15 Claims, 5 Drawing Sheets

MONITOR CIRCUIT 110

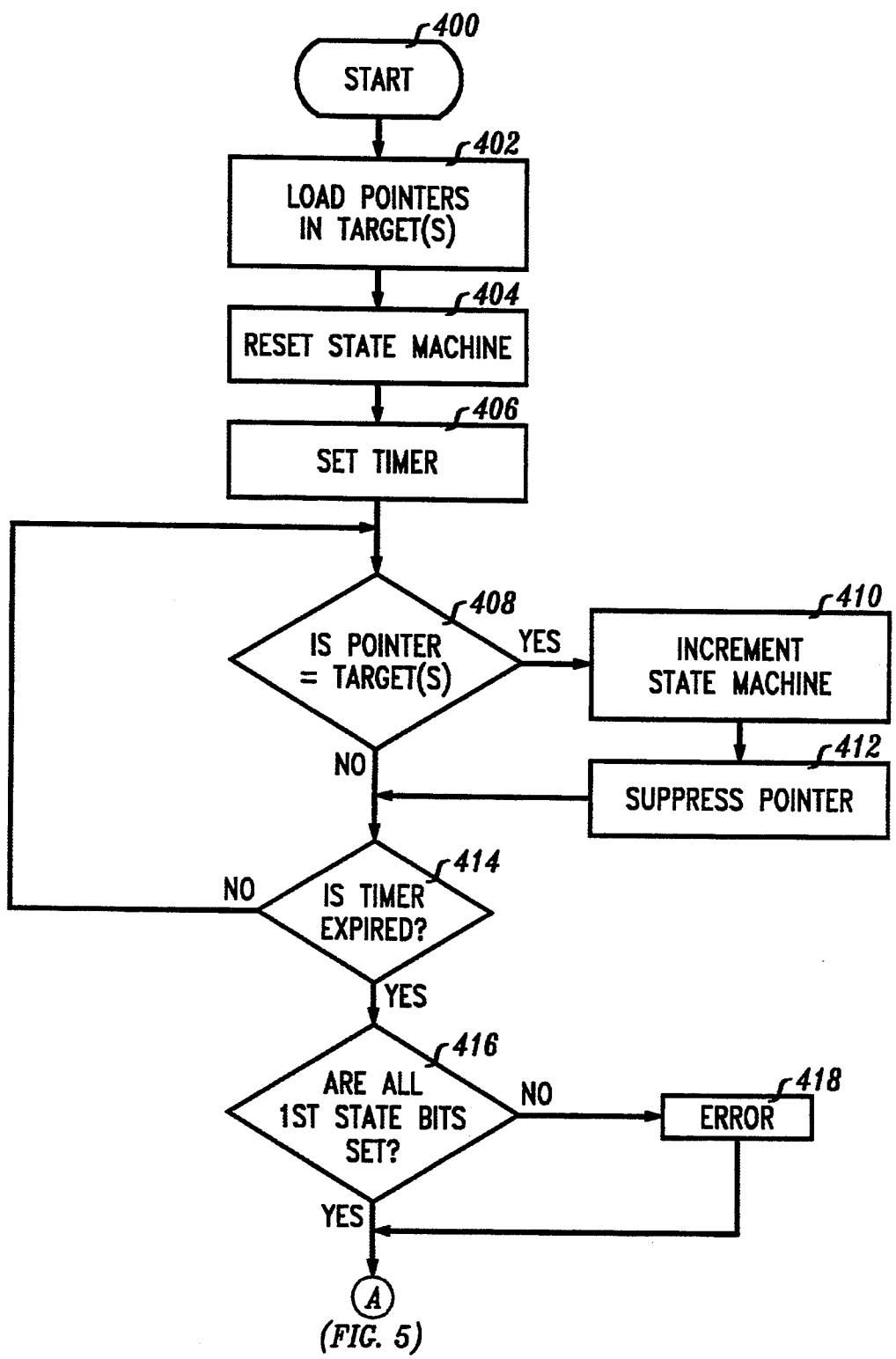

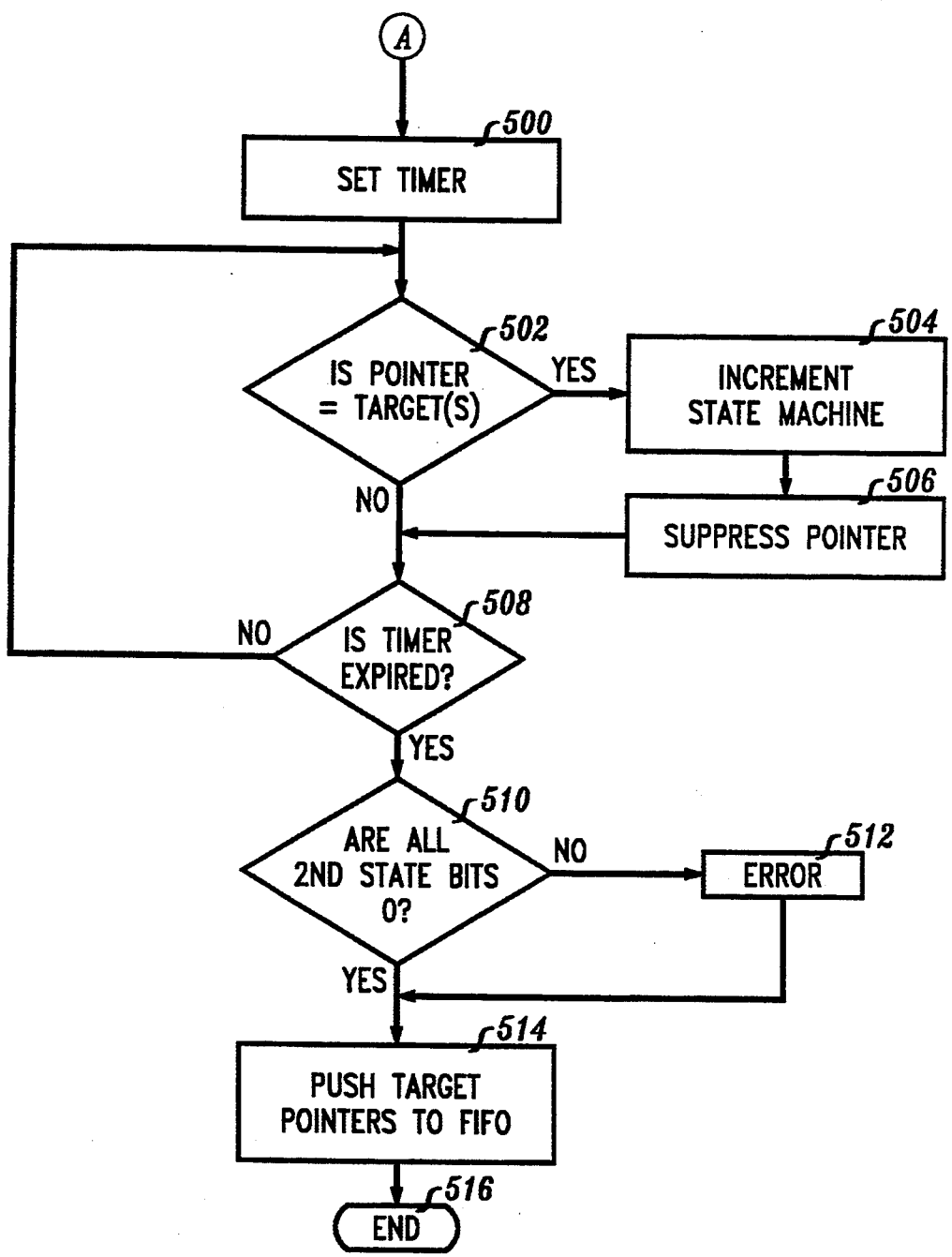

SYSTEM AND METHOD FOR MONITORING THE VALIDITY OF CIRCULATING POINTERS IN A FIFO MEMORY

CROSS-REFERENCE TO RELATED APPLICATION

This application is related to U.S. Pat. No. 5,291,482 to C.G. McHarg et al, entitled "High Bandwidth Packet Switch," filed concurrently with this application.

TECHNICAL FIELD

This invention relates to the field of resource allocation in computer systems and computer controlled systems, and more specifically to the area of monitoring circulating pointers to ensure their validity.

BACKGROUND OF THE INVENTION

Efforts to increase speed and throughput of various systems, specifically packet switching systems, involve using circulating pointers. These systems store data at an address pointed to by a circulating pointer, and then switch the pointer instead of switching the data through the system. Circulating pointer schemes increase switching speed because less data is being moved through the system (i.e., a pointer instead of an entire packet).

For example, the high bandwidth packet switch according to the invention of related U.S. Pat. No. 5,291,482 to McHarg et al., comprises a plurality of input ports, each comprising a first plurality of time slots; a plurality of output ports, each comprising a second plurality of time slots; and a plurality of message buffers, each being equal to or greater than the size of the largest expected message; all of which are interconnected by a bus. A buffer manager connected to the input ports and the output ports selects a circulating pointer which points to one of the message buffers in response to notification of receipt of an incoming packet during one or more time slots on one of the input ports. The buffer manager delivers the selected pointer to the receiving input port, the input port saves a destination address from the message and uses the circulating pointer to write the incoming message from the incoming time slot(s) to the selected message buffer.

When the write to the message buffer is completed, the input port delivers the circulating pointer and the destination address to a router connected to the input ports and the output ports. The router selects one of the plurality of output ports responsive to the destination address, and delivers the circulating pointer to the selected output port. The output buffer uses the circulating pointer to retrieve the message from the message buffer and then transmits the message through the appropriate time slot(s). The output port then delivers the circulating pointer to the buffer manager for reuse.

In the above-described system, or in a software system that uses circulating pointers, there is a risk that a circulating pointer may become duplicated or lost. A small voltage change, component weakness, programming error, or the like, which occur regularly in large, complex systems, can affect one bit or many bits in a pointer, which causes duplication or loss of a pointer. If a circulating pointer is lost, then there is a memory resource that cannot be accessed. If a circulating pointer is duplicated, then multiple writes occur to the same location in memory, and data is directed to the wrong destination or corrupted.

Therefore, a problem in the art is that there is no method for enforcing the validity of circulating pointers.

SUMMARY OF THE INVENTION

This problem is solved and a technical advance is achieved in the art by a pointer monitor that enforces the validity of circulating pointers. A target pointer generator in the pointer monitor generates one or more target pointers within a predefined range of the set of circulating pointers and compares the target pointers to the circulating pointers as they circulate through the pointer monitor. A first timer is set; and if a pointer does not circulate through the pointer monitor within a prespecified time, that is, no circulating pointer matches a target pointer before the timer expires, then a pointer has been lost and an error is reported. If a circulating pointer matches a target pointer, the circulating pointer is suppressed by being removed from the set of circulating pointers. Another timer is then set to determine whether further ones of the set of circulating pointers match the target pointer. If another pointer matches, then multiple pointers to the same location in memory are present and all duplicate pointers are suppressed. After expiration of the second timer, the target pointers are added to the set of circulation pointers. This process repeats with new target pointers, so that the validity of the entire set of circulating pointers is verified. Advantageously, the number of pointers checked in one prespecified time period may be a function of system congestion.

BRIEF DESCRIPTION OF THE DRAWING

FIGS. 4 and 5 are flow charts describing the flow of control of a monitor circuit according to the exemplary embodiment of this invention.

DETAILED DESCRIPTION

Figure 1:
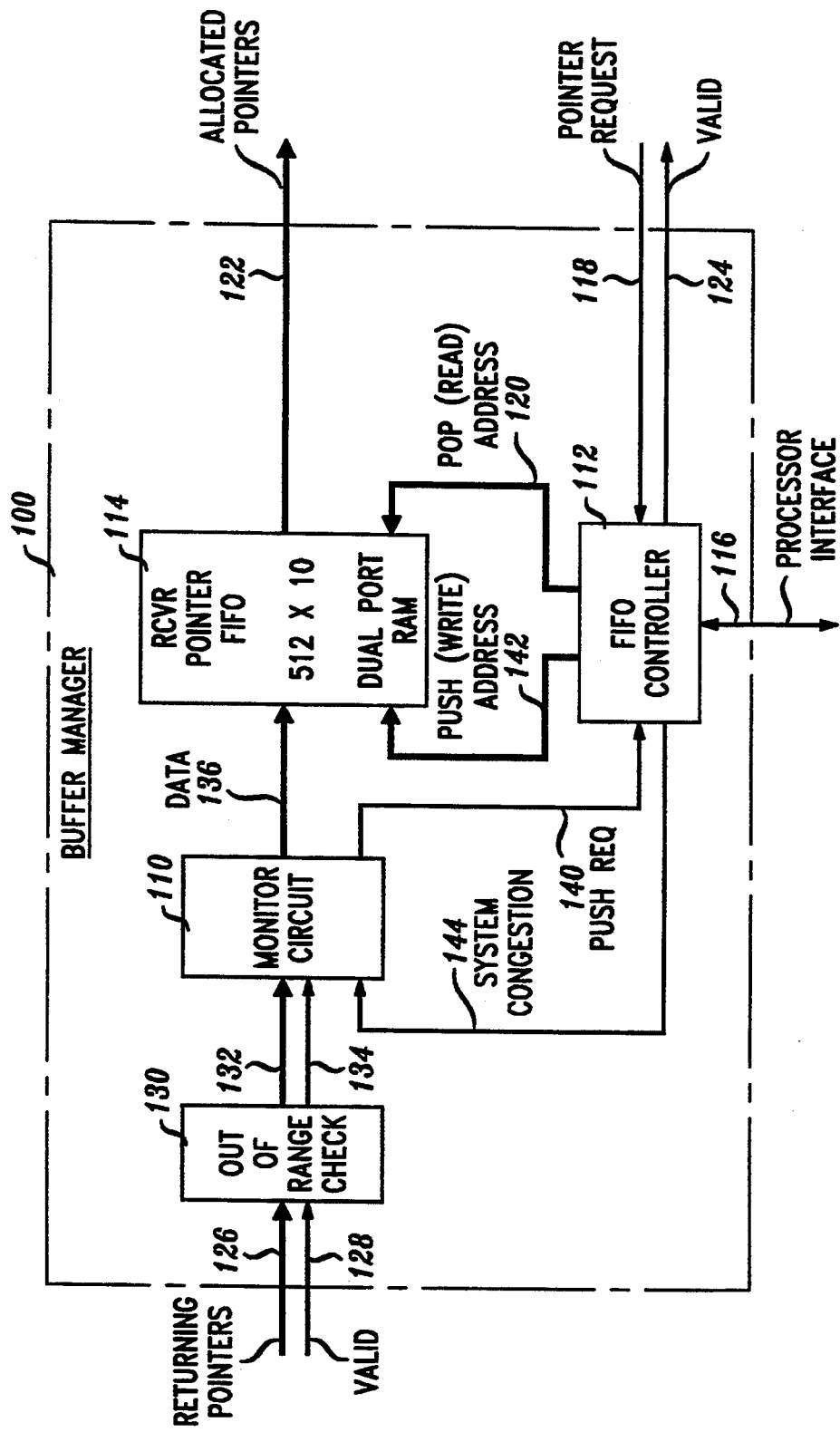
FIG. 1 is a block diagram illustrating an exemplary embodiment of a buffer manager as described in U.S. Pat. No. 5,291,482 incorporating a monitor circuit according

FIG. 1 is a block diagram of a buffer manager 100, including a monitor circuit 110 according to the exemplary embodiment of this invention. Buffer manager is similar to buffer manager 208, FIG. 12 of U.S. Pat. No. 5,291,482, but simplified for purposes of this application. Buffer manager 100 allocates circulating pointers for storing packetized data received from an incoming bus. The pointer may then be passed to a router which then determines the destination and passes the pointer to an output. The output then uses the pointer to read the data from the buffer and distribute the data according to the destination. The output then returns the pointer to the buffer manager. This system is more fully described in U.S. Pat. No. 5,291,482 which is incorporated herein by reference. The monitor circuit according to this invention has, however, far wider applicability than this particular exemplary embodiment and this embodiment is by no means limiting.

Buffer manager 100 comprises a first-in-first-out (FIFO) controller 112, a monitor circuit 110 and a receiver pointer FIFO 114 that stores circulating pointers until used by the system. FIFO controller 112 controls the reading and writing of FIFO 114 in response to pointer requests on input lead 118 and push requests on lead 140. Pointer monitor 110 enforces pointer validity, in accordance with the present invention, as will be described further in connection with FIG. 2 below. FIFO 114 comprises a dual port random access memory (RAM) which is initialized at the time of system initialization via processor interface 116. Processor interface 116 comprises a bus connected to a microprocessor (not shown), as is known in the art, which provides initialization and updates to FIFO 114. Processor interface 116 is also used to deliver reports of errors found by pointer monitor 110, as will be described below.

Requests for pointers are received by FIFO controller 112 on pointer request line 118. In response, FIFO controller 112 causes a pop operation to be sent over pop address line 120 to pointer FITFO 114. Pointer FIFO 114 delivers pointers to the allocated pointers bus 122 and valid line 124 is asserted by FIFO controller 112. Parity checks, as are known in the art, may be performed at this point.

Returning pointers arrive on returning pointers bus 126 when valid line 128 is asserted. A first check of the range of the pointer is made in out-of-range circuit 130, as is known in the art. This check suppresses pointers that point to locations outside the range of the buffer memory. If this test passes, then the pointer is delivered via bus 132 to monitor circuit 110 and a further valid line 134 is asserted.

Monitor circuit 110 enforces the validity of circulating pointers by generating one or more target pointers within a pre-specified range, and comparing the target pointers to pointers circulating through the monitor circuit, that is, pointers returning after use. If a pointer is not encountered within a prespecified time, then it is presumed that the pointer has been lost and an error is reported. When a pointer is encountered, it is suppressed so that it is removed from circulation. A second timer is then set to determine whether the pointer is encountered again. If the pointer is encountered again, then all encountered pointers are suppressed and an error is reported. After the second timer expires, the generated pointer is then pushed onto pointer FIFO 114 as a circulating pointer. Monitor circuit 110 then generates a further one or more target pointers and performs the same tests on these new targets. This method continually repeats, with new target pointers being generated, etc., so that monitor circuit 110 checks all of the set of circulating pointers.

After monitor circuit 110 performs its tests of each target pointer, then monitor circuit 110 places the pointer on data bus 136 and asserts the push request line 140 to the FIFO controller 112. FIFO controller 112 sends the next address to FIFO 114 via push address bus 142, and FIFO 114 writes the received pointer to the assigned memory location. If there is a high demand for pointers, that is, many circulating pointers are being used at a given time, FIFO controller 112 informs monitor circuit 110 via system congestion line 144. Monitor circuit 110 responds by generating fewer target pointers, thus taking less system time.

Figure 2:
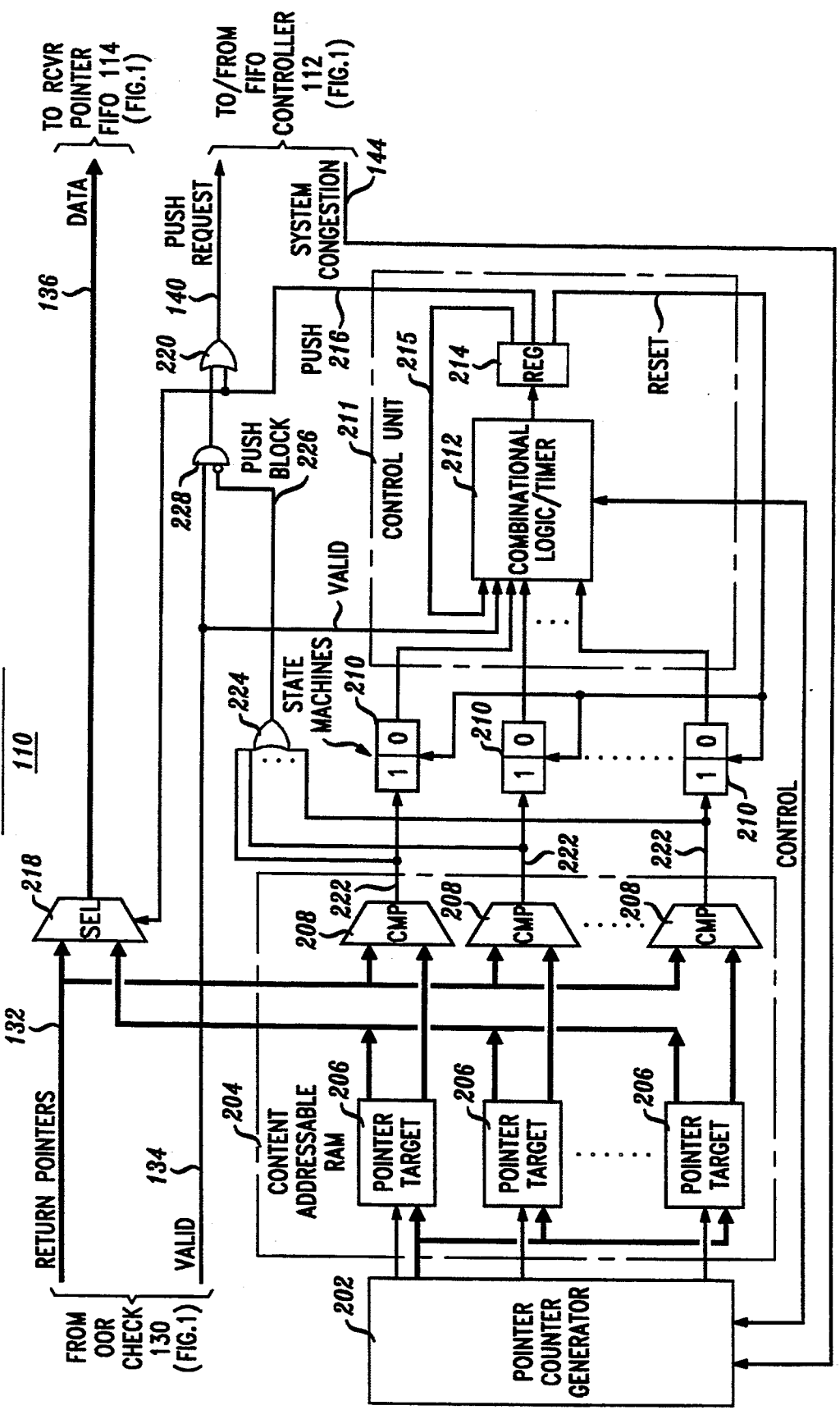
FIG. 2 is a diagram illustrating a monitor circuit according to an exemplary embodiment of this invention.

Turning now to FIG. 2, monitor circuit 110 according to an exemplary embodiment of this invention is shown. In FIG. 2, monitor circuit 110 includes a pointer counter generator 202 which generates target pointers within a prespecified range and delivers the generated target pointers to a content addressable RAM 204. Content addressable RAM 204 stores the target pointers in predetermined memory locations, herein labeled pointer targets 206. As a pointer is returned on the return pointers bus 132 and valid line 134 is asserted, the returned pointer is also delivered to a plurality of comparators 208. Target pointers are also delivered to these comparators 208 in content addressable RAM 204. When a target pointer matches a returning pointer, theta a corresponding state machine 210 is incremented, which causes the corresponding state machine 210 to transition to a valid state. After a predetermined time, control unit 211 determines which of the pointer targets were encountered. Control unit 211 comprises a state machine, including combinational logic/timer 212, a register 214, and a feed back loop 215, as is known in the art.

If the pointer delivered on return pointers bus 132 does not match any of the target pointers, as determined by combinational logic/timer 212, then nothing is done to block the valid line 134 from being asserted. Valid line 134 asserts the push request through OR gate 220, and the pointer is delivered on data bus 136 to FIFO 114 (FIG. 1).

If the pointer matches one of the target pointers, then comparator 208 asserts line 222 which increments state machine 210 and causes OR gate 224 to assert push block line 226. Asserting push block line 226 causes AND gate 228 to block the valid signal which suppresses the pointers on return pointers bus 132, thus preventing the pointer on bus 132 frown returning to FIFO 114 (FIG. 1) and being reused. After a predetermined period of time, combinational logic/timer 212 checks state machines 210 to determine whether all target pointers were encountered. If not, an error condition is reported.

A second timer is then set. Because all of the target pointers have been suppressed, as described above, if a further circulating pointer matches a target pointer, then a duplicate pointer has been found. State machine 210 increments, thus transitioning to the duplicate state, and combinational logic/timer 212 may report an error condition. After the second timer expires, control unit 211 causes each target pointer to be written to data line 136 through selector 218, and register 214 asserts the push request, thereby pushing the target pointer onto FIFO 114 (FIG. 1). Processing of the next set of target pointers then occurs. Processing continues until all of the valid pointers are checked; then processing begins again.

Figure 3:
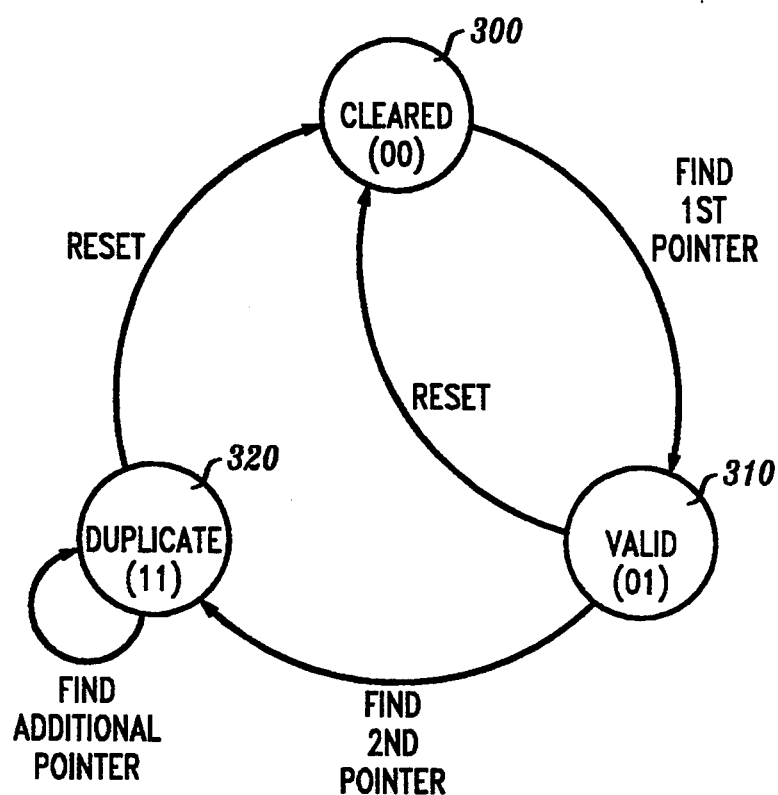
FIG. 3 is a state diagram illustrating the permitted states and the transition between states in the state machine of FIG. 2.

Turning now to FIG. 3, a state machine diagram is shown showing the three states of state machines 210 of FIG. 2. In this exemplary embodiment of the invention, there are three states: cleared 300 (00), valid 310 (01), and duplicate 320 (11). Processing begins in cleared state 300. When a returning pointer matches the generated pointer, processing moves to valid state 310. If the target pointer is not found again during the second predetermined time, then a reset causes the state to change back to cleared 300. If a second pointer is encountered during the second predetermined time, then the state transitions to the duplicate state 320. Processing transitions from duplicate state 320 to duplicate state 320 every time another pointer is encountered that matches a target pointer. Eventually, a reset causes the state to change from duplicate state 320 back to cleared state 300.

Turning now to FIG. 4, processing according to the exemplary embodiment of this invention is shown. Processing begins at 400; starting at box 402, the target pointers are loaded into the content addressable RAM 204. At box 404, the state machine is reset, and then a timer is set at box 406.

In decision diamond 408, a test is made to determine whether the pointer being returned is equal to one of the generated pointers. If the pointer being returned is equal to one of the generated pointers, then processing proceeds to box 410 where the state machine is incremented, and then processing continues to box 412 where the return pointer is suppressed.

Processing from both decision diamond 408 and box 412 continues to decision diamond 414 where a determination is made if the timer has expired. If the timer has not expired then processing proceeds back to decision diamond 408. If, in decision diamond 414, the timer has expired, then processing continues to decision diamond 416 where a determination is made whether all first state bits in state machines 210 are set. If all state machine bits are not set then an error has been encountered and processing continues to box 418 where an error routine is invoked. Processing continues through connector A to FIG. 5.

Turning now to FIG. 5, from connector A, a timer is set at box 500. At decision diamond 502, a determination is made whether a pointer being returned is equal to one of the targets in the content addressable RAM. If the pointer being returned is equal to one in the content addressable RAM, then processing continues to box 504 where the state machine is again incremented. Processing proceeds to box 506, where the pointer is suppressed.

Processing front both decision diamond 502 and box 506 continues to decision diamond 508 where a determination is made whether the timer has expired. If the timer has not expired then processing returns to decision diamond 502.

If, in decision diamond 508, the timer has expired, then processing proceeds to decision diamond 510 where a determination is made whether any second state bits in state machine 210 are set (not 0). If a second bit is set, then processing proceeds to box 512 where an error routine is invoked. Following the error routine from box 512, or if no second bit is set in state machine 210 in decision diamond 510, the process continues to box 514, where the generated pointers are pushed into the pointer FIFO and processing ends at 516.

It is to be understood that the above-described embodiments are merely illustrative principles of the invention and that many variations may be devised by those skilled in the art without departing from the scope of the invention. For example, this invention has been described in connection with a specific circuit implementation. This invention is easily implementable as a software process for auditing circulating pointers. It is, therefore, intended that such variations be included within the scope of the appended claims.

We claim:

1. A method for enforcing the validity of circulating pointers in a system having an addressable memory and a set of circulating pointers corresponding to addresses of said addressable memory, said method comprising the steps of:
    establishing a target pointer as a sole pointer to a selected location in said addressable memory; and
    removing all pointers from the set of circulating pointers that point to said selected location in said addressable memory during a predetermined period of time.

2. A method according to claim 1 wherein said system further includes a processor, said method further comprising the step of determining whether each of said set of circulating pointers matches said target pointer during a second predetermined period of time, and if more than one of said set of circulating pointers matches said target pointer during said second predetermined period of time, reporting an error to said processor.

3. A method according to claim 1 further comprising the step of, after removing all pointers from said set of circulating pointers that point to said selected location in said addressable memory, adding said target pointer to said set of circulating pointers.

4. A method according to claim 1 wherein the establishing and removing steps are repeated for each location in said addressable memory.

5. A method according to claim 1 wherein said step of establishing a target pointer comprises generating a plurality of target pointers each as a sole pointer to one of a plurality of selected locations in said addressable memory.

6. A method according to claim 5 wherein the number of target pointers in said plurality of target pointers is a function of system congestion.

7. A method according to claim 1 wherein said system further includes a processor, said method further comprising the step of determining whether one of said set of circulating pointers matches said target pointer during a first portion of said predetermined period of time, and, if none of said set of circulating pointers matches said target pointer during said first portion of said predetermined period of time, reporting an error to said processor.

8. A method according to claim 7 further comprising the step of, after removing all pointers from said set of circulating pointers that point to said selected location in said addressable memory, adding said target pointer to said set of circulating pointers.

9. A system for enforcing the validity of circulating pointers in a system having an addressable memory and a set of circulating pointers each corresponding to a location in said addressable memory, said system comprising:
    means for generating a target pointer within a prespecified range of locations of said addressable memory;
    means, responsive to a determination that said target pointer matches one of said set of circulating pointers during a first predetermined time period, for removing the matching circulating pointer from said set of circulating pointers, and responsive to a determination that said target pointer matches a further one of said set of circulating pointers during a second predetermined time period, for removing the matching further circulating pointer from said set of circulating pointers; and
    means, responsive to expiration of said second predetermined time period, for adding said target pointer to said set of circulating pointers.

10. A system according to claim 9 further comprising means for storing said target pointer, said means for storing comprising a content addressable random access memory (RAM) and a comparator, said comparator comparing said target pointer stored in said content addressable RAM to each of said set of circulating pointers.

11. A system according to claim 10 wherein said means responsive to a determination that said target pointer matches one of said set of circulating pointers during a first predetermined time period comprises combinational logic for blocking the matching circulating pointer from continuing to circulate responsive to receipt of a signal from said comparator.

12. A system according to claim 10 wherein said means responsive to a determination that said target pointer matches a further one of said set of circulating pointers comprises combinational logic for blocking the matching further circulating pointer from continuing to circulate responsive to receipt of a signal from said comparator.

13. A method for enforcing the validity of circulating pointers in a system having an addressable memory and a set of circulating pointers each corresponding to a location in said addressable memory, said method comprising the steps of:

generating a target pointer within a prespecified range of locations of said addressable memory;

responsive to a determination that said target pointer matches one of said set of circulating pointers during a first predetermined time period, removing the matching circulating pointer from said set of circulating pointers;

responsive to a determination that said target pointer matches a further one or more circulating pointers of said set of circulating pointers during a second predetermined time period, removing the matching further one or more circulating pointers from said set of circulating pointers; and adding said target pointer to said set of circulating pointers.

14. A method according to claim 13 wherein said step of generating a target pointer comprises generating a plurality of target pointers each corresponding to a location in said addressable memory.

15. A method according to claim 13 further including a step of repeating each of the steps for each pointer of said set of circulating pointers.

* * * * *